Figures 1, 2:
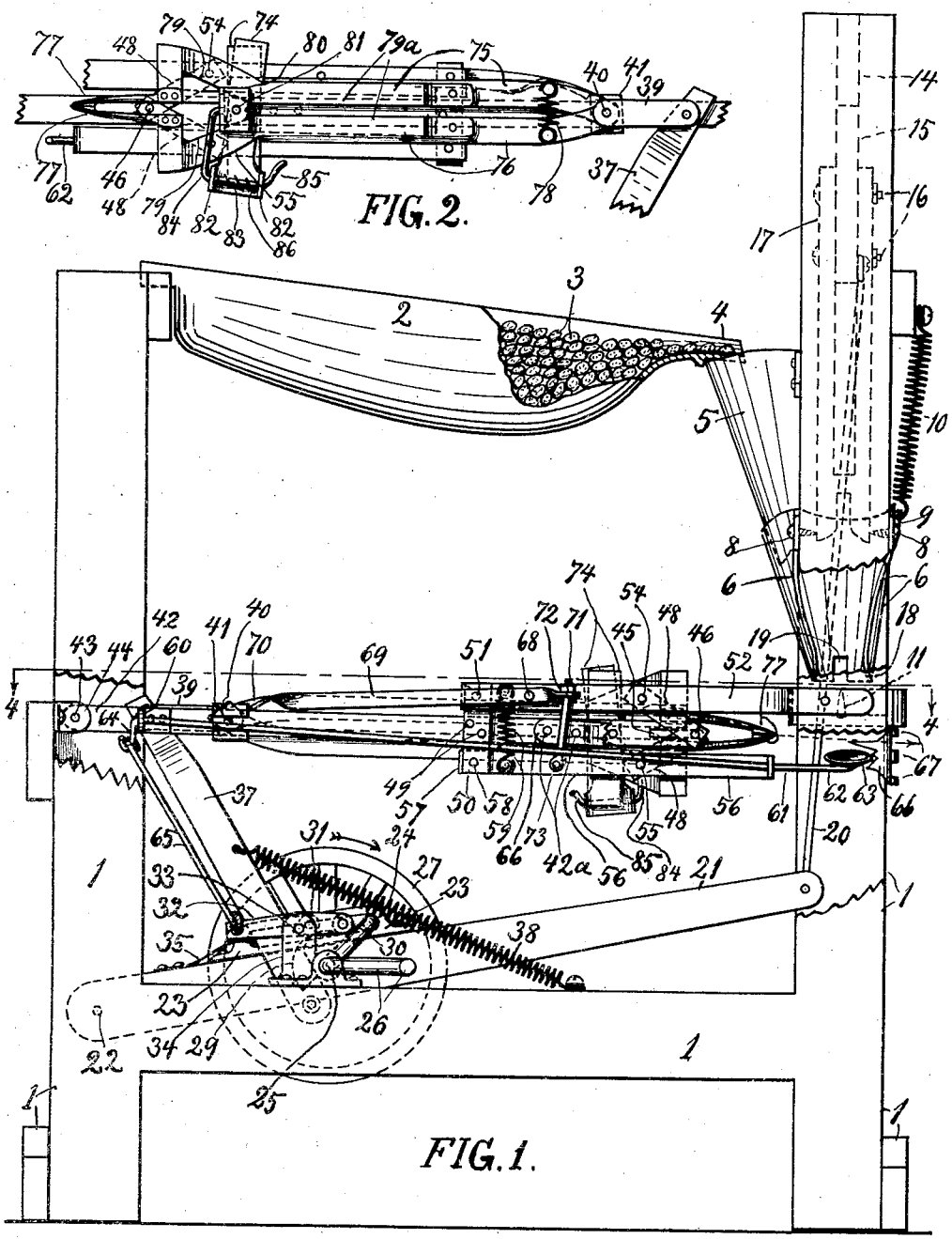

J. O. JACOBSON.
POTATO CUTTING MACHINE.
APPLICATION FILED APR. 30, 1920.

1,362,103. Patented Dec. 14, 1920.
2 SHEETS—SHEET 1.

INVENTOR:
John O. Jacobson.
BY his ATTORNEY:
A. M. Carlsen.

J. O. JACOBSON.
POTATO CUTTING MACHINE.
APPLICATION FILED APR. 30, 1920.
1,362,103.
Patented Dec. 14, 1920.
2 SHEETS—SHEET 2.
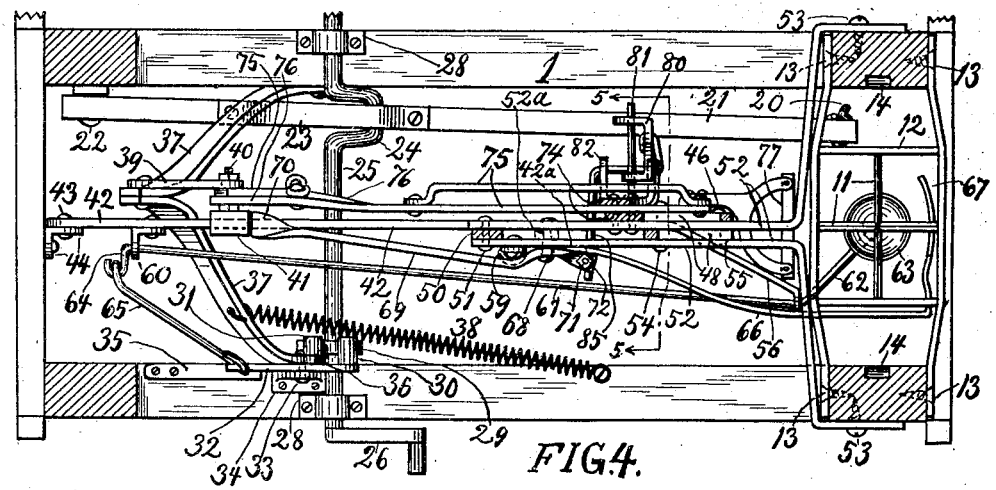
INVENTOR:
John O. Jacobson.
BY his ATTORNEY:
A. M. Carlsen.

UNITED STATES PATENT OFFICE.

JOHN O. JACOBSON, OF NIELSVILLE, MINNESOTA.

POTATO-CUTTING MACHINE.

1,362,103.   Specification of Letters Patent.   Patented Dec. 14, 1920.

Application filed April 30, 1920. Serial No. 377,993.

*To all whom it may concern:*

Be it known that I, JOHN O. JACOBSON, a citizen of the United States, residing at Nielsville, in the county of Polk and State of Minnesota, have invented a new and useful Potato-Cutting Machine, of which the following is a specification.

My invention relates to machines for cutting seed potatoes into several pieces before planting the same, and the object is to provide a machine of said kind so improved that the various sizes of potatoes fed into the machine will act on the mechanism of the machine and cause the potato to be cut into few or many pieces according to its size.

In the accompanying drawing:

Figure 1 is a side elevation of the complete machine except fragments broken away to give better view of parts beyond them. Fig. 2 is a portion of Fig. 1 seen from the opposite side. Fig. 3 is a right hand end view of Fig. 1, or for convenience of description it may be called a front elevation of the machine, with the potato hopper and the top and bottom portions of the main frame and some other parts omitted. Fig. 4 is a section on the line 4—4 in Fig. 1. Fig. 5 is a section on the line 5—5 in Fig. 4, showing more clearly on a slightly enlarged scale certain parts of the mechanism. Fig. 6 is an enlarged detail left side view of the cam 29.

Referring to the drawing by reference numerals, 1 designates the main frame of the machine, it may be of any suitable form. Mounted in the upper part of the frame 1 is a magazine 2, holding potatoes, as 3, ready to be fed by hand through an open guide 4 into a chute 5. The lower end of said chute projects downwardly into a hopper composed of two members 6, between which there is a variable opening 7, because the two members are pivoted to the frame at 8 and loosely attached together at 9 and at the latter point are supported by a coil spring 10, which at all times tend to close the lower ends of the members 6 together or against opposite sides of any size potato so as to guide the same centrally down upon a cross-shaped cutter 11 (best shown in Fig. 4) fixed in a frame 12, secured by screws 13 to the main frame.

Guided to slide in vertical grooves 14 in the frame 1, is a flat cross head 15, to which is bolted at 16 a plunger 17, whose lower end 18 has a cross-shaped notch 19 as a clearance for the crossed knife 11, when the plunger pushes a potato down, say like the potato 3ª in Fig. 3, cutting it in four pieces against the knife.

The cross-head is reciprocated up and down by a connecting rod 20 and a lever 21, which is pivoted at 22 and provided with a slotted yoke 23, in which operates a crank 24 of a shaft 25. Said shaft may be operated by a hand crank 26 or a pulley 27 where belt power is available. So far for cutting the potato in four pieces; the mechanism for cutting it into eight or 12 pieces will now be described.

The shaft is journaled in bearings 28, and fixed on it is a cam 29, of about half-moon-shape. Contacting with the face of the cam are two antifriction rollers, 30 and 31. Roller 30 is carried by a horizontal lever 32, fulcrumed at 33 to a bracket 34 and held in contact with the cam by a spring 35 (see Figs. 1 and 4). The other roller, 31, is mounted on a short forwardly projecting arm 36 of one leg of an A-shaped lever 37 and is constantly held in contact with the cam by a coil spring 38 acting on said lever 37.

The upper end of the lever 37 is connected by a link 39 to a stud 40 fixed in a block 41, which is slidable on the bar 42. Said bar 42 has its rear end pivoted at 43 to a bracket 44 fixed on the main frame. The front end of bar 42 is formed with a longitudinal gap or slot 45 (see Fig. 1). Movable in said slot is the pivot 46 of a knee joint formed of two flat links 48. Near the middle of the bar 42 is secured by rivets 49 (see Fig. 1) a vertical bracket bar 50. Pivoted at 51 to said bracket are the rear ends of two bars 52, whose front portions are bent laterally at about right angles and then forwardly and pivoted at 53 to the main frame. Between said bars 52 is pivoted at 54 the upper end of the upper link 48; while the lower end of the lower link is pivoted at 55 to an arm 56, whose rear end 57 is pivoted at 58 to the bracket 50, (see Fig. 1). A spring 59 tends at all times to swing the arm 56 upward, it being suspended from the arm 52.

Journaled in the front end of arm 56 and in a bearing 60 fixed on bar 42, is a rock shaft 61, whose front end has a lateral arm

62 with a small dish 63 fixed on it, in readiness to support the cut potatoes until the shaft 61 is rocked by the arm 64 at the rear end of it; said arm 64 is operated by a rod 65, lever 32 and spring 35, as soon as the cam 29 permits the lever 32 to tilt.

Fixed at 42ª on the bar 42 is an arm 66 mostly broken away in Fig. 1, which carries three lateral fingers 67, (see Figs. 3 and 4) by which to resist the front side of a potato when one or more horizontal cutting blades cut it from the rear side, as will presently be described.

Pivoted at 68 to the arms 52 and their spacing block 52ª is a lever 69, the long rear arm of which serves as a catch or dog 70 against the block 41, while the short front arm of it has an aperture up through which extends a rod 71, having a nut 72 on it. The lower end of said rod is attached at 73 to the arm 56, (see Fig. 1), so that when the latter arm is sufficiently swung downward by the potato 3ª the rod 71 and its nut 72 will cause the dog 70 to raise and release the sliding block 41, as will be more fully explained in the operation of the machine.

As best shown in Figs. 2, 4 and 5, at the left side of the machine is fixed to the bar 42 a small vertical frame composed of two flat bars 74 secured together by a spacing block 74ª, a rivet 74ᵇ and an arm 81. Between said bars 74 are guided to swing up and down, so as to spread and close, two yokes 75, 76, the rear ends of which are pivoted on the stud 40 and their front ends are each provided with a horizontal cutter blade 77, which are normally held close together by a spring 78 acting on the yokes so as to amount to but a single blade cutting the four quarters of the potato at the middle, making eight pieces of a medium sized potato of the large variety. If the potato is extra large the blades 77 will spread apart and cut it in two places, thus making twelve pieces out of it.

The mechanism that spreads the blades 77 is as follows: The front ends of the yokes 75, 76 are formed with divergent edges 79, (see Fig. 2) between which may enter a spreading element 80, which is slidable on the arm 81 extending from the small frame 74, (see Fig. 5). The lower end of frame 74 is formed with bearings 82 for a rock-shaft 83 having two arms 84, 85. The arm 84 engages the spreader 80 to slide it in and out of the path of movement of the yokes; the other arm 85, extends over to the other side of the whole mechanism and is there pressed downward by the arm 56, and is raised again by a torsion spring 86, whereby the spreader 80 is thrown beyond the yokes so the blades 77 can close again. When the blades 77 are in spread or parted position the edges 79ª of the yokes remain in parallel position while sliding on the spreader 80.

In the operation of the machine it has already been stated how the potatoes are fed by hand one by one into the chute 5, and as a large potato is usually of elongated form it is dropped endwise into the chute and is thus cut lengthwise into four pieces by the cross-shaped stationary cutter 11 and is dropped into a suitable receptacle (not shown), because the dish or pan 63 is swung away when the cam 29 permits spring 35 to act. But before the cam 29 can reach that position, if the potato is large enough to depress the lever or arm 56 so far that the rod 71 disengages the dog 70, the sliding block 41 is thereby released and the spring 38 throws the A-shaped lever 37 forward and thereby causes the two blades 72 to cut the potato at the middle whereupon the cam 29 will allow spring 35 to act and drop the potato cut in eight pieces.

Again, if the potato is very large it will swing the arm 56 so far down that it will also operate the rocker arm 85 and throw the spreader 80 into the path of the yokes and thus cause the blades 77 to separate, and cut the potato horizontally in two places thus making 12 pieces of it, whereupon the pan 63 will release and drop it. Until so released the potato is held between the pan and the end of the plunger 17 and guarded by the fingers 67.

The service of the links 48 and their joint pivot 46 in the slot 45 is to support the parts connected with the links and to control the movement of said parts.

To insure a more full understanding of the operation, it may be stated that the blades 77 are not set at full liberty to move forward only by the releasing of the dog 70 from block 41, as the blades might then move forward too early or before spread for cutting an extra large potato; the action of the spring 38 is therefore also controlled by the cam 29 after the dog is lifted.

What I claim is:

1. In a potato cutting machine and mounted in a frame, a cross-shaped stationary cutter, a plunger arranged to push one potato at a time against the edges of said cutter and past the same, and a movable cutter arranged to cut the same potato across the cuts made by the stationary cutter, and means operating the plunger and means operating the movable cutter, and means for a large potato to act on and automatically cause the movable cutter to start into action.

2. The structure specified in claim 1, said movable cutter composed of two blades normally closed together so as to make but one cut, means for automatically spreading said blades apart so as to make two cuts, and means for an extra large potato to act on and automatically cause the spreading means to become active and spread the blades.

3. The structure specified in claim 1 and means for suporting and holding the potato during the action of the movable cutter, and means for automatically releasing the potato after it is cut.

4. The structure specified in claim 2, and automatic means for holding the potato during the action of the spreading movable cutter and then releasing the pieces of the potato.

In testimony whereof I affix my signature.

JOHN O. JACOBSON.

Witnesses:
LESTER K. LINDBLAD,
H. M. KNUTSON.